United States Patent [19]

Madenokoji

[11] 4,123,215

[45] Oct. 31, 1978

[54] VACUUM FORMING APPARATUS

[75] Inventor: Tadahide Madenokoji, Tokyo, Japan

[73] Assignee: Kodama Kagaku Kohyo K. K., Tokyo, Japan

[21] Appl. No.: 700,186

[22] Filed: Jun. 28, 1976

Related U.S. Application Data

[63] Continuation of Ser. No. 416,800, Nov. 19, 1973, abandoned.

[30] Foreign Application Priority Data

Nov. 22, 1972 [JP] Japan .................................. 47-117307

[51] Int. Cl.² ............................................. B29C 17/04
[52] U.S. Cl. ........................... 425/388; 425/DIG. 60; 264/90
[58] Field of Search ............... 425/388, 812, DIG. 60, 425/416, 457, 403, 470; 264/90, 92, DIG. 78

[56] References Cited

U.S. PATENT DOCUMENTS

| | | | |
|---|---|---|---|
| 2,442,338 | 6/1948 | Borkland | 425/388 X |
| 2,832,094 | 4/1958 | Groth | 425/388 |
| 2,910,728 | 11/1959 | Rowe, Jr. | 425/388 |
| 3,041,669 | 7/1962 | Marshall et al. | 425/388 X |
| 3,123,863 | 3/1964 | Reilly et al. | 425/324 X |
| 3,172,927 | 3/1965 | Mojonnier | 425/388 X |
| 3,179,726 | 4/1965 | Perry | 425/388 X |
| 3,181,202 | 5/1965 | Martelli et al. | 425/388 X |
| 3,207,821 | 9/1965 | Jones-Hinton et al. | 425/388 X |
| 3,231,647 | 1/1966 | Oesterheld | 425/388 X |
| 3,583,036 | 6/1971 | Brown | 425/388 X |
| 3,608,055 | 9/1971 | Long | 425/DIG. 44 |
| 3,753,830 | 8/1973 | Cruchshark et al. | 425/388 X |
| 3,815,863 | 6/1974 | Andeweg | 425/DIG. 44 |

FOREIGN PATENT DOCUMENTS

| | | | |
|---|---|---|---|
| 1,255,532 | 1/1961 | France | 425/388 |
| 1,310,298 | 3/1973 | United Kingdom | 425/388 |

Primary Examiner—Robert L. Spicer, Jr.
Attorney, Agent, or Firm—Oblon, Fisher, Spivak, McClelland & Maier

[57] ABSTRACT

A forming mold of double wall structure is provided which while having a reduced wall thickness, undergoes little or no deformation upon forming. A vacuum forming method employing the novel mold is also disclosed.

17 Claims, 18 Drawing Figures

VACUUM FORMING APPARATUS

This is a continuation of Application Ser. No. 416,800 filed Nov. 19, 1973, now abandoned.

BACKGROUND OF THE INVENTION

The present invention relates to a method of vacuum forming from thermoplastic sheets and a mold therefor.

Figure 1:
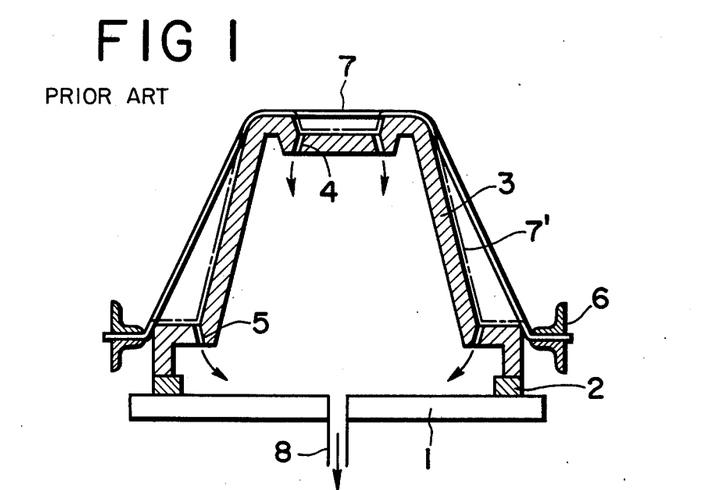
FIGS. 1 and 2 are schematic views showing examples of conventional vacuum forming mold.
Figure 2:
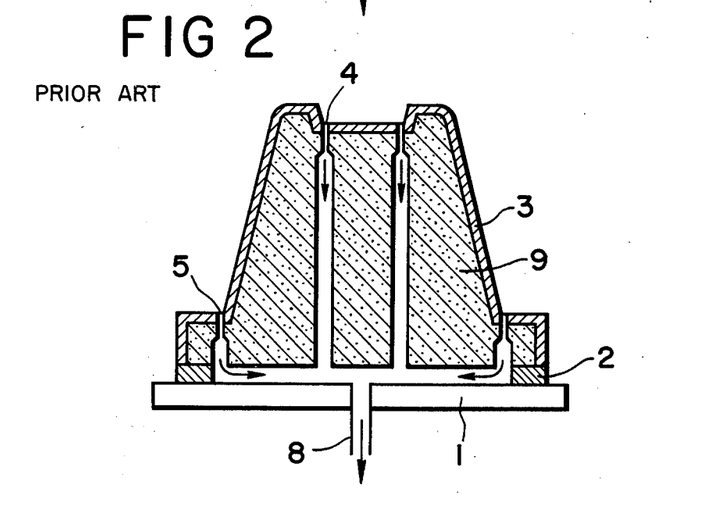

A method is already known which forms products from thermoplastic resin sheets by vacuum forming. One example of the conventional vacuum forming method and mold therefor is illustrated in FIG. 1. The vacuum forming machine shown includes a bed 1 on which a mold 3 is mounted with gasket 2 interposed therebetween. The mold is hollow and has a plurality of vacuum suction holes 4 and 5 distributed over the entire mold or partially where necessary as in the top and bottom thereof. A sheet 7 is tightly held in place by clamping frame 6 and is softened under heat. Under this condition, the mold 3 is thrust against the sheet 7 from below to the position shown. After the mold 3 has moved into sealing engagement with the sheet 7, the air in the mold 3 is exhausted by a suction pipe 8. Thereupon, a vacuum is established in the space between the sheet 7 and the mold 3 whereby the sheet 7 is pressed into contact with the outer surface of the mold by the atmospheric pressure and assumes a shape shown by reference numeral 7'. In the process described, the atmospheric pressure of approximately 1 kg. per $cm^2$ is applied to the surface of the mold 3, so that a large sized mold having a surface area of 4 $m^2$ will be subjected to a load of approximately 40 ton. The mold is usually made as an alminium casting, which must have a thickness on the order of 30 mm in order to avoid deformation under such load, and which must be additionally reinforced with ribs, posts or the like located on its interior surface. Where the mold is made from resin material or the like, a packing 9 of material such as gypsum, cement or the like must be provided to fill its interior, as shown in FIG. 2, in order to prevent the mold from collapsing under the atmospheric pressure upon forming. All these add to the weight and cost of the mold as well as the inconveniences in its handling. Further, the mold lift mechanism of the vacuum forming machine must be capable of lifting the heavy mold which weighs in excess of 1 ton.

SUMMARY OF THE INVENTION

It is an object of the present invention to provide a mold for a vacuum forming method which has a reduced weight and still undergoes little or no deformation upon froming.

It is another object of the present invention to provide a mold for a vacuum forming method which lends itself to the simplification of a vacuum forming machine.

BRIEF DESCRIPTION OF THE DRAWING

The above and other objects, features and advantages of the present invention will become apparent upon a reading of the following detailed description taken together with the drawings, in which.

DETAILED DESCRIPTION OF THE INVENTION

Although the embodiments of the method and the mold according to the present invention will be described with reference to FIGS. 3 to 18 below, it is to be noted that they are illustrative only, and not limiting the scope of the invention.

Figures 3, 4:
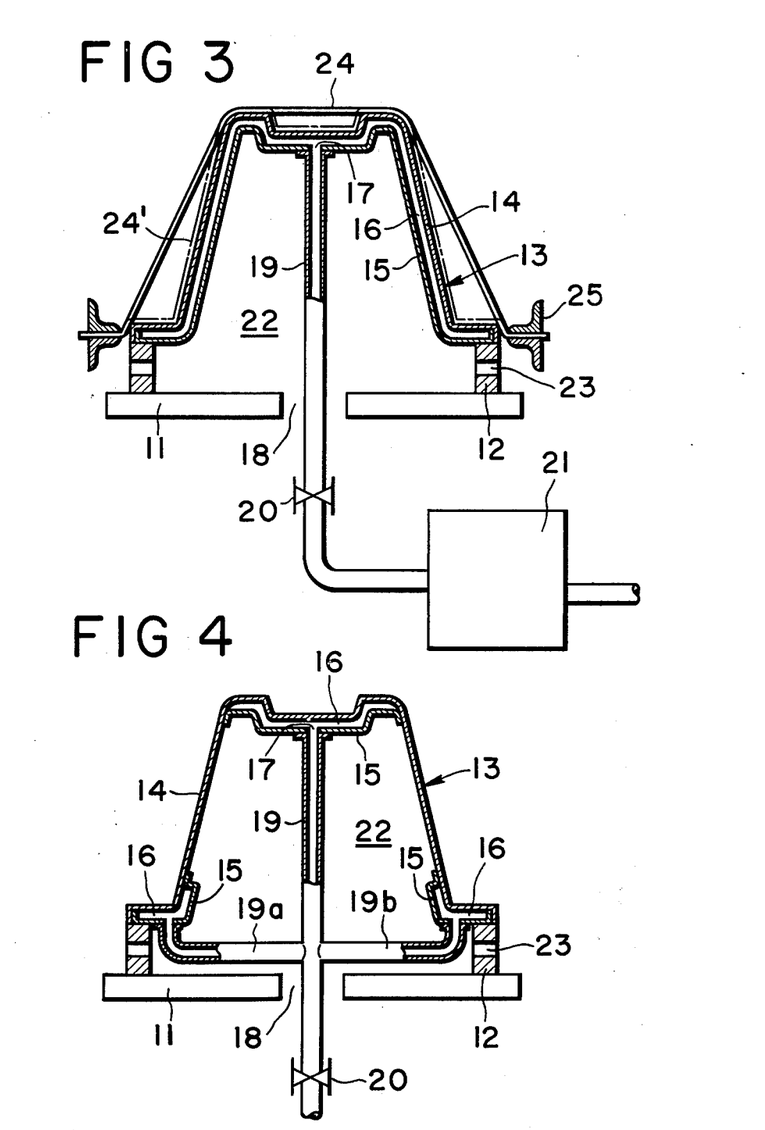
FIG. 3 is a schematic view showing the vacuum forming method and the mold according to the present invention.
FIG. 4 is a schematic view of another embodiment of the present invention.

Referring to FIG. 3, a vacuum forming machine is generally shown at 11 and includes a mold mounting frame 12. A forming mold 13 is securely mounted on the mold mounting frame 12. The forming mold 13 is formed as a hollow composite structure comprising a pair of mold plates 14 and 15, which are reinforced by a reinforcing structure to be described in detail hereinafter. The reinforcing is not shown in FIG. 3 to simplify the structure illustrated. The mold plate 14 is formed with vacuum suction holes as will be described later. A hollow space 16 between the mold plate 14 and 15 communicates with an opening 17 formed in the mold plate 15, which in turn communicates with a suction pipe 19 leading to a vacuum tank 21. The pipe 19 extends through an opening 18 in the bed 11 of the machine, and includes a valve 20. An inner space 22 of the mold communicates with the atmosphere through the opening 18 and vent holes 23 formed in the mold mounting frame 12. A softened sheet 24 is shown as thrusted by the mold 13 and clamped across a clamping clamp 25.

In FIG. 4, the mold 13 has a double structure only in the portion where vacuum suction holes are located, that is, in the top and bottom portions, and an intermediate side wall portion is formed as a single layer. The double structure portions are connected to the vacuum tank through the suction pipe 19 and branch suction pipes 19a and 19b, the valve 20 being positioned in the pipe 19 nearer the vacuum tank than the interconnection between these pipes. In other respect, the mold is similar to that described in connection with FIG. 3, and as in FIG. 3, the reinforcing structure is not illustrated.

Figure 5:
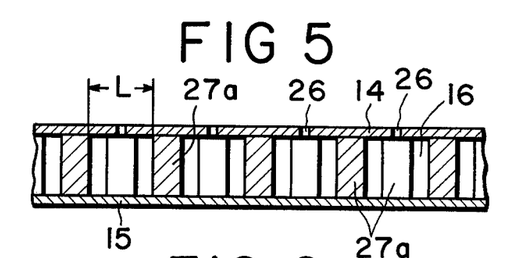
FIG. 5 is an enlarged cross-sectional view of part of the mold according to the present invention.
Figure 6:
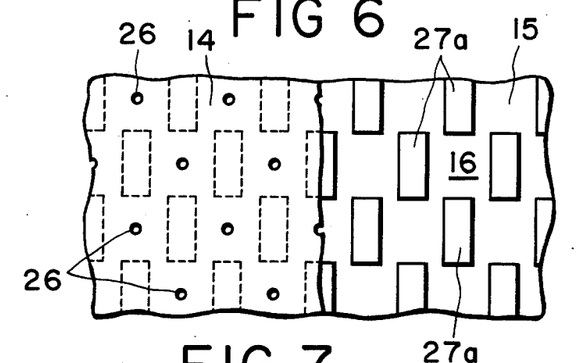
FIG. 6 is a plan view, partly broken to show the interior of the mold plate shown in FIG. 5.
Figure 7:
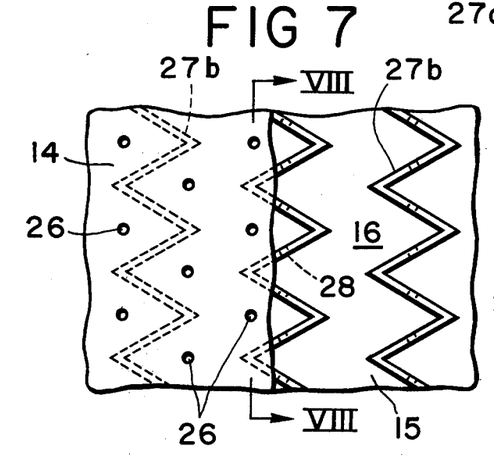
FIG. 7 is a fragmentary plan view of another example of the double structure for the mold according to the present invention.
Figure 8:
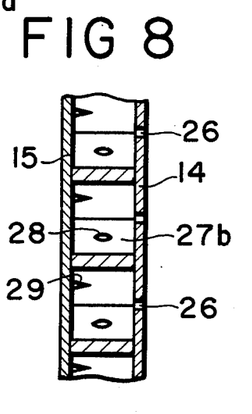
FIG. 8 is a cross-sectional view taken along the line VIII—VIII in FIG. 7.
Figure 9:
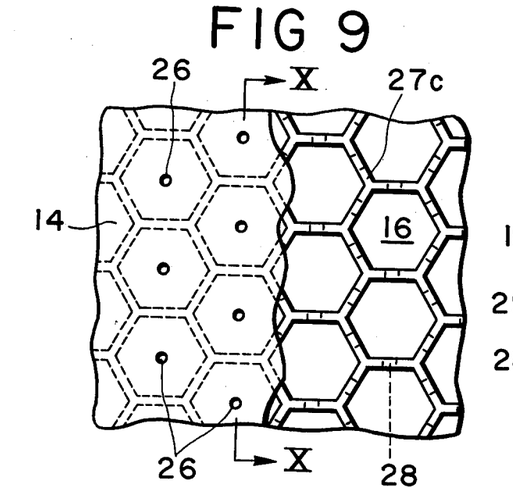
FIG. 9 is a fragmentary plan view of a further embodiment example of the double wall structure.
Figure 10:
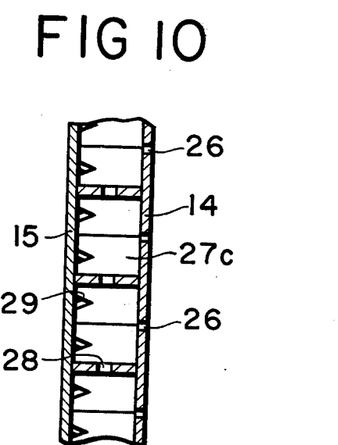
FIG. 10 is a cross-sectional view taken along the line X—X in FIG. 9.
Figure 11:
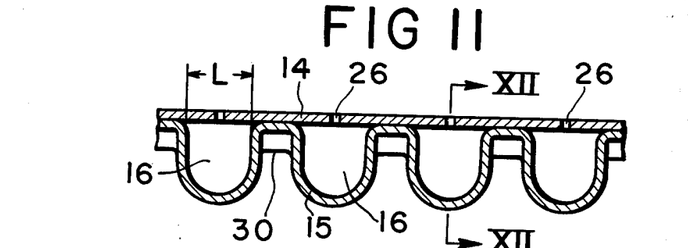
FIG. 11 is a fragmentary cross-sectional view of a still further embodiment of the present invention.
Figure 12:
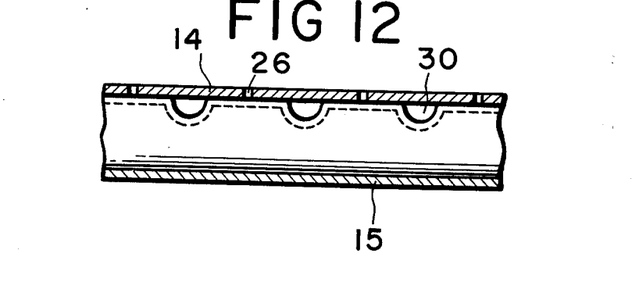
FIG. 12 is a cross-sectional view taken along the line XII—XII in FIG. 11.

The hollow structure of such portion defined by the mold plates 14 and 15 of the mold 13 can be constructed as illustrated in FIGS. 5 to 10 which shows the reinforcing structure not illustrated in FIGS. 3 and 4. A plurality of vacuum suction holes 26 are formed in the mold plate 14 which represents a forming surface of the mold 13, and a reinforcing member or members are arranged between the mold plates 14 and 15 in a manner to permit communication throughout the hollow space 16. Specifically, the reinforcing structure may comprises a staggered array of rectangular blocks 27a as shown in FIGS. 5 and 6, a parallel array of zig-zag shaped members 27b as shown in FIGS. 7 and 8, or a honeycomb structure 27c as shown in FIGS. 9 and 10. In the structures shown in FIGS. 7 and 9, holes 28 and/or notches 29 are formed in the core member so as to communicate the hollow portions 16 with each other. Alternatively, the hollow portions 16 may be formed by using a corrugated member for the mold plate 15 as shown in FIGS. 11 and 12. In this instance, the limbs of the corrugated mold plate 15 serve the reinforcement, and the hollow portions 16 can communicate with each other through tunnels 30.

The thickness of the mold plates 14 and 15 as well as the construction of the reinforcing structure should be such that their deformation is prevented when the hollow portions undergo a vacuum. In FIGS. 5 and 11, the distance between the adjacent reinforcing members is designated by L, and it will be seen that if the distance L is small, the load applied to the mold plate in an area between them is very small. If the L is chosen 1 cm, the applied load thereon is less than 1 kg, and an aluminium plate of 1 mm in thickness has a sufficient strength to withstand this load.

A forming method employing the mold as constructed in the manner mentioned above will be described below. Referring to FIG. 3, the forming mold 13 is thrust against the sheet 24 clamped in place by raising the bed 11 with the lift means (not shown) of the vacuum forming machine, the sheet 24 being softened under heat at this time. The sheet 24 is stretched out as shown in solid line in FIG. 3 and maintains an air tight seal with the outer periphery of the mold 13. The valve 20 is then opened to exhaust the air trapped between the mold 13 and the sheet 24 through the vacuum suction holes 26 (see FIGS. 5 to 12) of the outer mold plate 14, the hollow portion 16 of the mold 13 and the suction pipe 19 into the vacuum tank 21. The pressure between the mold 13 and the sheet 24 is substantially reduced and the atomospheric pressure is loaded on the outer surface of the sheet 24, whereby the latter is deformed and pressed tightly against the outer mold plate 14 of the mold to assume the configuration 24' shown in chain lines. At this time, the atmospheric pressure is applied to the outer mold plate 14 through the sheet 24' and also applied to the rear side of the inner mold plate 15, resulting in a balanced force across the mold. The strength required of the mold 13 should be sufficient to overcome the resistance presented by the sheet 24 when it is streched by the mold 13 at a forming temperature used. The above description applies equally to the embodiment shown in FIG. 4.

The forming mold having the double structure as described above may be readily manufactured by first preparing the mold plates from iron sheet, or using in place therefor, a mat comprising more than one layer of glass fibre impregnated with epoxy resin, applied thereon with rectangular wood pieces serving as reinforcing members, and laminated with FRP.

An embodiment of the forming mold having the double structure only partially may be formed by providing tunnel members where suction is to be applied. The tunnel member comprises an exhaust passage which is semicircular in section. The tunnel members are connected with the vacuum tank by way of the suction pipes. This results in a further reduction in the weight and the cost. Thus, in the embodiment shown in FIG. 13, a mold 33 is constructed by a single plate, wall 34 having suction holes 36 formed therein. A plurality of exhaust passage members 35 semicircular in section and formed of aluminium or hard plastic core secured to the inner side of the wall portion where holes 36 are located. One or more connecting pipes 37 are mounted on each member 35 (see FIG. 14). Tunnels 38 formed by the members 35 secured to the mold wall are connected to a concentrated suction tank 39 mounted on the bed 11 through connecting pipes 37 and the pipes 40, and thence to a vacuum tank (not shown) through the suction pipe 19.

Figures 13, 14:
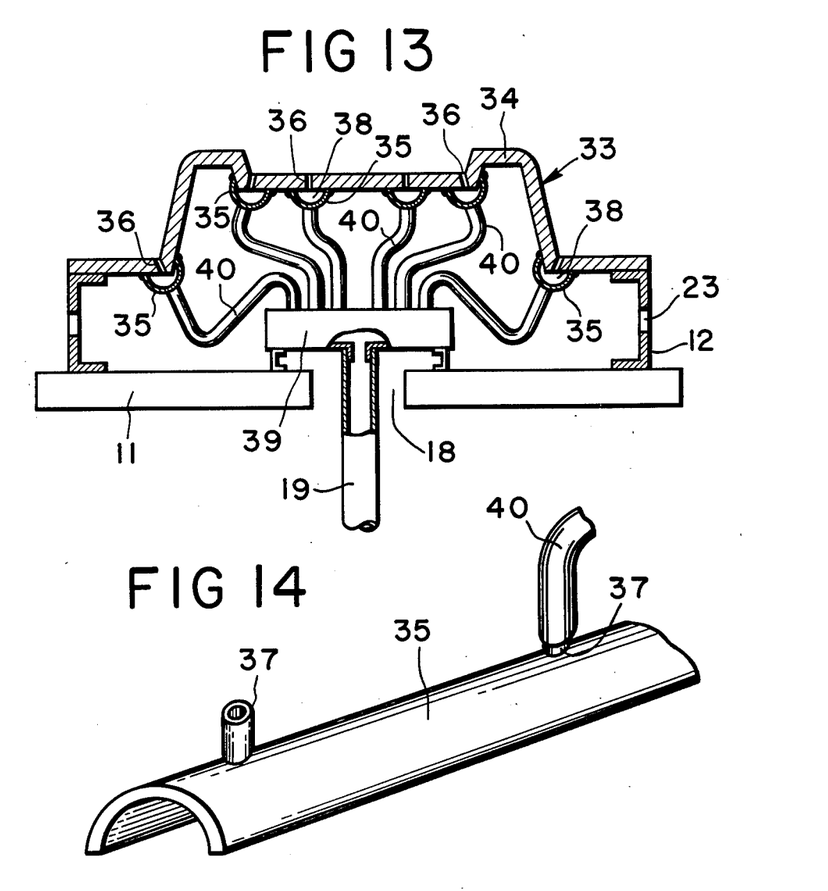
FIG. 13 is a schematic view showing a further embodiment of the vacuum forming method and the mold according to the present invention.
FIG. 14 is a fragmentary perspective view of the exhaust passages used in the embodiment shown in FIG. 13.

In the embodiment of FIGS. 13 and 14, the members 35 forming the exhaust tunnel 38 are secured to the rear surface of the mold wall 34 by adhesion or welding. No air leakage should occur here, since otherwise there would be an adverse influence upon the vacuum forming. The difficulty of assuring a reliable adhesion or welding can be minimized by a forming mold 43 constructed as shown in FIGS. 15 to 18.

Referring to these Figures, the mold 43 has a mold wall 44 formed by a single plate, the mold wall 44 being made to have the strength required to withstand without its deformation a force for stretching a softened plastic sheet 24. Suction holes 46 are formed through the wall 44, and passage members 45 which are semi-circular in section and which form exhaust tunnels 48 are secured to the inner side of the wall 44 at positions where the suction holes 46 are provided. The tunnels 48 are interconnected with each other and with a suction chamber 49 (FIG. 17) by means of passage members 45a having a similar cross-sectional shape to the passage member 45. At or adjacent to the area of the passage members 45 and 45a, the wall 44 must have sufficient strength to withstand without deformation the pressure differential applied thereacross occurring as a result of the atmospheric pressure on the outer surface and the vacuum or reduced pressure on its inner surface. The passage members 45 and 45a may be formed by the dividing into two equal parts lengthwise of a tube of aluminium or hard vinyl chloride measuring 10 mm, for example, in diameter, since an opening of these members on the order of this value is sufficient for all practical purposes. Their location does not require a high accuracy as required in the previous embodiments, and clamping bands 50 are applied at suitable intervals to prevent them from being displaced. This greatly simplifies the manufacturing of the mold without accompanying any distortion on the mold surface.

Figure 15:
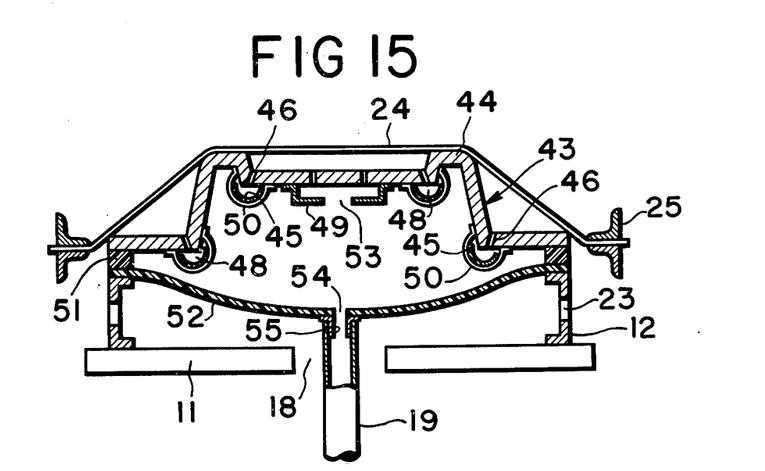
FIG. 15 is a schematic view showing a still further embodiment of the vacuum forming method and the mold according to the present invention.

A rubber diaphragm 52 has its periphery clamped between the mold mounting frame 12 and the forming mold 43 with a gasket seal 51 interposed between the disc and the mold. The rubber diaphragm 52 has a port 54 therein at a position opposite to a port 53 in the suction chamber 49, and the port 54 is connected, by means of a fitting 55, with the suction pipe 19 which leads to a vacuum tank, not shown. The region of the rubber diaphragm 52 adjacent to the port 54 may be secured to the wall of the suction chamber 49.

Figure 16:
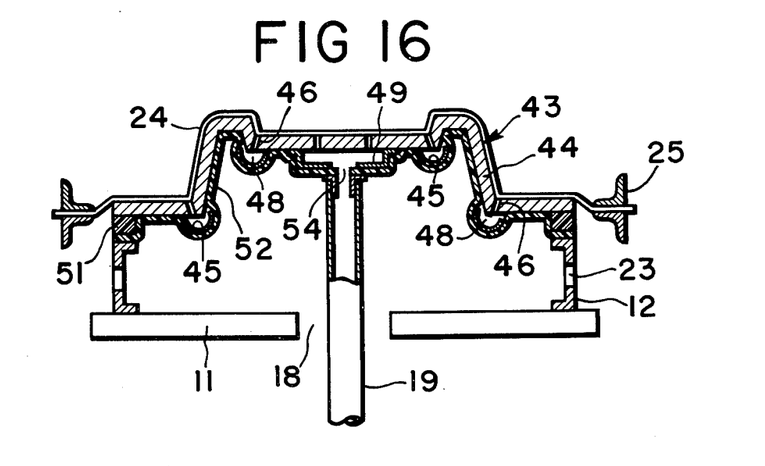
FIG. 16 is a schematic view showing the embodiment of FIG. 15 in its operative position.
Figure 17:
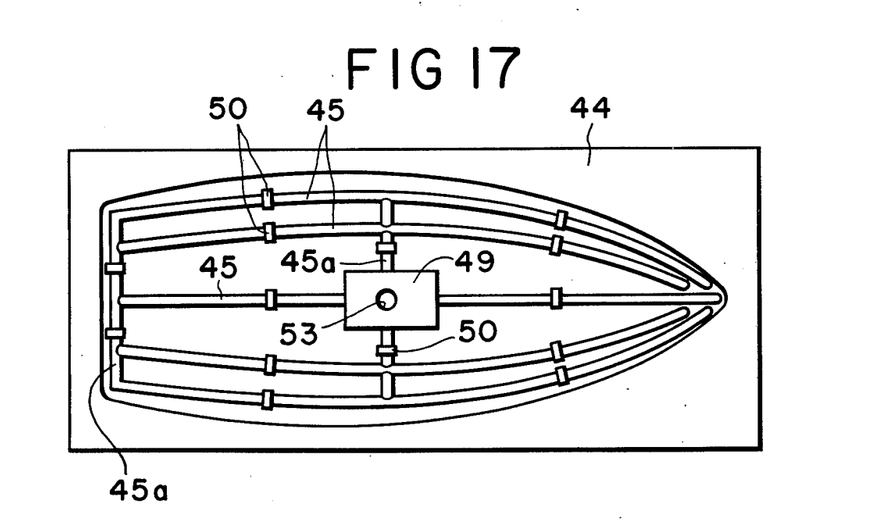
FIG. 17 shows a lay-out of the exhaust passages which is applicable to the embodiment shown in FIG. 15.
Figure 18:
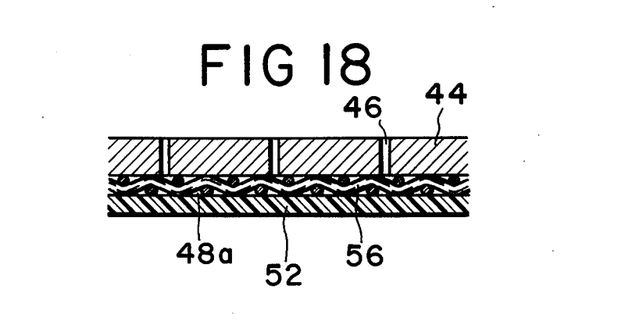
FIG. 18 is a cross-sectional view showing a modification of the mold shown in FIG. 15.

In operation, the mold 43 is thrust from below against a softened sheet 24 which has its periphery secured by the clamping frame 25 (FIG. 15). A valve (not shown) in the suction pipe 19 is opened to initiate evacuation of the mold, whereupon a reduction in the pressure occurs in the space between the mold 43 and the diaphragm 52 as well as in the space between the mold 43 and the sheet 24. Since the rubber diaphragm 52 is more easily streched than the sheet 24, the diaphragm 52 is initially urged into tight abutting relationship with the inner side of the mold 43. The air in the space between the sheet 24 and the mold 43 continues to be exhausted through suctionholes 46 and tunnels 48 into the suction chamber 49, and thence through the ports 53 and 54 and the suction pipe 19 into the vacuum tank, whereby the sheet 24 is pressed into tight abutment against the outer surface of the mold 43 (FIG. 16). Any defective seal between the edge of the passage members 45 and the inner surface of the mold 43 does not matter since the members 45 are subject to the atmospheric pressure on its outer surface to eliminate or minimize any clearance therebetween, and no puncture of the diaphragm 52 occurs as a result of its being drawing into such clearance. Because the pressures applied to the opposite surfaces of the mold 43 are balanced, no force is applied thereto which will induce a deformation thereof. Thus the mold wall 44 may be constructed with a thin and light material.

In the above embodiment, the resilient diaphragm 52 may be replaced by an air-impervious and flexible fabric or plastic sheet having a similar shape to the configuration of the mold or having an area greater than that of the latter, with similar result. Where the diaphragm is replaced by a fabric cloth, there would be doubling or folding of the cloth upon evacuation, but this causes no adverse influence upon the vacuum forming. In addition, the passage members 45 may be omitted and replaced by a single or double layer of metal meshwork 56 (FIG. 18) having a fine mesh size on the order of 10 meshes, for example, in combination with the rubber diaphragm 52. By choosing a suitable thickness, say 1.5 mm, for the rubber diaphragm 52, an excessive biting of the wires of the meshwork 56 into the rubber diaphragm 52 is prevented to leave a continuous space 48a within the meshwork 56 so that the suction holes 46 remain effective to apply suction to the sheet. The atmospheric pressure on the diaphragm 52 is transmitted to the inner side of the mold 43 in a uniform manner. This variation permits an arbitrary choice of location of suction holes 46 all over the mold.

In a comparison test conducted with a prior art mold and a mold as constructed according to the invention, both in the form of a flat aluminium plate, it has been found that a thickness of 27.5 mm was necessary in the solid wall construction of the prior art while the mold according to the invention needed only to have a thickness of 0.4 mm when the exhaust tunnel measured 10 mm across its opening. It will be appreciated that an increased thickness will be necessary for practical purposes in view of the mechanical strength required in its handling.

While the invention has been illustrated and described with reference to a male mold, it should be understood that the invention can equally be applied to a female mold, and that the shape of the mold need not be limited to the particular shape illustrated.

I claim:

1. A vacuum forming mold for use in a vacuum forming operation in which a heated and softened plastic sheet secured in place is shaped which comprises a first shaped mold plate including an exterior surface against which said secured plastic sheet is disposed and an oppositely directed interior surface, a second mold plate disposed in juxtaposed spaced relation to at least a shaped portion of said interior surface of said first shaped mold plate forming an enclosed hollow space therebetween, said second mold plate having at least one opening, a vacuum source, a connecting pipe extending between said vacuum source and said at least one opening in said second mold plate so that a vacuum can be drawn through the enclosed hollow space, a plurality of openings provided in the first mold plate so that the vacuum established in the enclosed hollow space can draw said secured plastic sheet against the exterior surface of said first shaped mold plate, reinforcing members located within the enclosed hollow space extending between the interior surface of said first mold plate and the facing surface of said second mold plate for preventing the deformation of said first and second mold plates when a vacuum is drawn through the enclosed hollow space, said reinforcing members subdividing the enclosed hollow space into a plurality of subspaces and said reinforcing members having openings therethrough intercommunicating the subspaces, and means for moving said exterior surface of said first mold plate against said secured plastic sheet wherein said means for moving said exterior surface of said first mold plate includes a bed member, with an opening provided therein, so as to form an inner space disposed between said bed member and said second mold plate, such that said inner space is communicated to atmosphere through said opening provided in said bed member and wherein said connecting pipe extends through said opening and is partially disposed within said inner space.

2. A vacuum forming mold, as set forth in claim 1, wherein said reinforcing members comprise an array of laterally spaced parallel zig-zag shaped members, forming said subspaces therebetween.

3. A vacuum forming mold, as set forth in claim 1, wherein said reinforcing members comprise a plurality of wall members defining a honey-comb structure with said honey-comb structure defining a plurality of separate subspaces.

4. A vacuum forming mold, as set forth in claim 1, wherein said second mold plate comprises a corrugated member and said reinforcing members comprise limbs of said corrugated member.

5. A vacuum forming mold, as set forth in claim 1, wherein said at least one opening in said second mold plate comprises a pair of openings connected by a pair of connecting pipes.

6. A vacuum forming mold, as set forth in claim 1, wherein said at least one opening in said second mold plate comprises three openings connected by three connecting pipes.

7. A vacuum forming mold, as set forth in claim 1, which further comprises means for clamping said secured plastic sheet in place and wherein said means for moving said exterior surface of said first mold plate against said secured plastic sheet further comprises means for raising said bed member.

8. A vacuum forming mold, as set forth in claim 1, wherein said connecting pipe includes a plurality of pipes connected between said vacuum source and said at least one opening in said second mold plate and wherein said second mold plate is disposed in juxtaposed spaced relation to only a portion of said first mold plate contiguous to the connection of said plurality of pipes with said at least one opening in said second mold plate.

9. A vacuum forming mold, as set forth in claim 8, wherein said second mold plate comprises a corrugated member and said reinforcing members comprise limbs of said corrugated member.

10. A vacuum forming mold, as set forth in claim 8, wherein said at least one opening in said second mold plate comprises a pair of openings connected by a pair of connecting pipes.

11. A vacuum forming mold, as set forth in claim 8, wherein said at least one opening in said second mold plate comprises three openings connected by three connecting pipes.

12. A vacuum forming mold, as set forth in claim 8, which further comprises means for clamping said secured plastic sheet in place and wherein said means for moving said exterior surface of said first mold plate against said secured plastic sheet further comprises means for raising said bed member.

13. A vacuum forming mold, as set forth in claim 8, wherein said second mold plate is disposed in juxtaposed spaced relation to only the top and bottom portions of said first mold plate with an intermediate portion disposed therebetween comprising only said first mold plate.

14. A vacuum forming mold, as set forth in claim 5, which further comprises vent members interconnecting said second mold plate and said bed member for communicating said inner space to atmosphere.

15. A vacuum forming mold, as set forth in claim 8, which further comprises vent members interconnecting said second mold plate and said bed member for communicating said inner space to atmosphere.

16. A vacuum forming mold, as set forth in claim 8, wherein said reinforcing members comprise an array of laterally spaced parallel zig-zag members, forming said subspaces therebetween.

17. A vacuum forming mold, as set forth in claim 8, wherein said reinforcing members comprise a plurality of wall members defining a honey-comb structure with said honey-comb structure defining a plurality of separate subspaces.

* * * * *